UNITED STATES PATENT OFFICE.

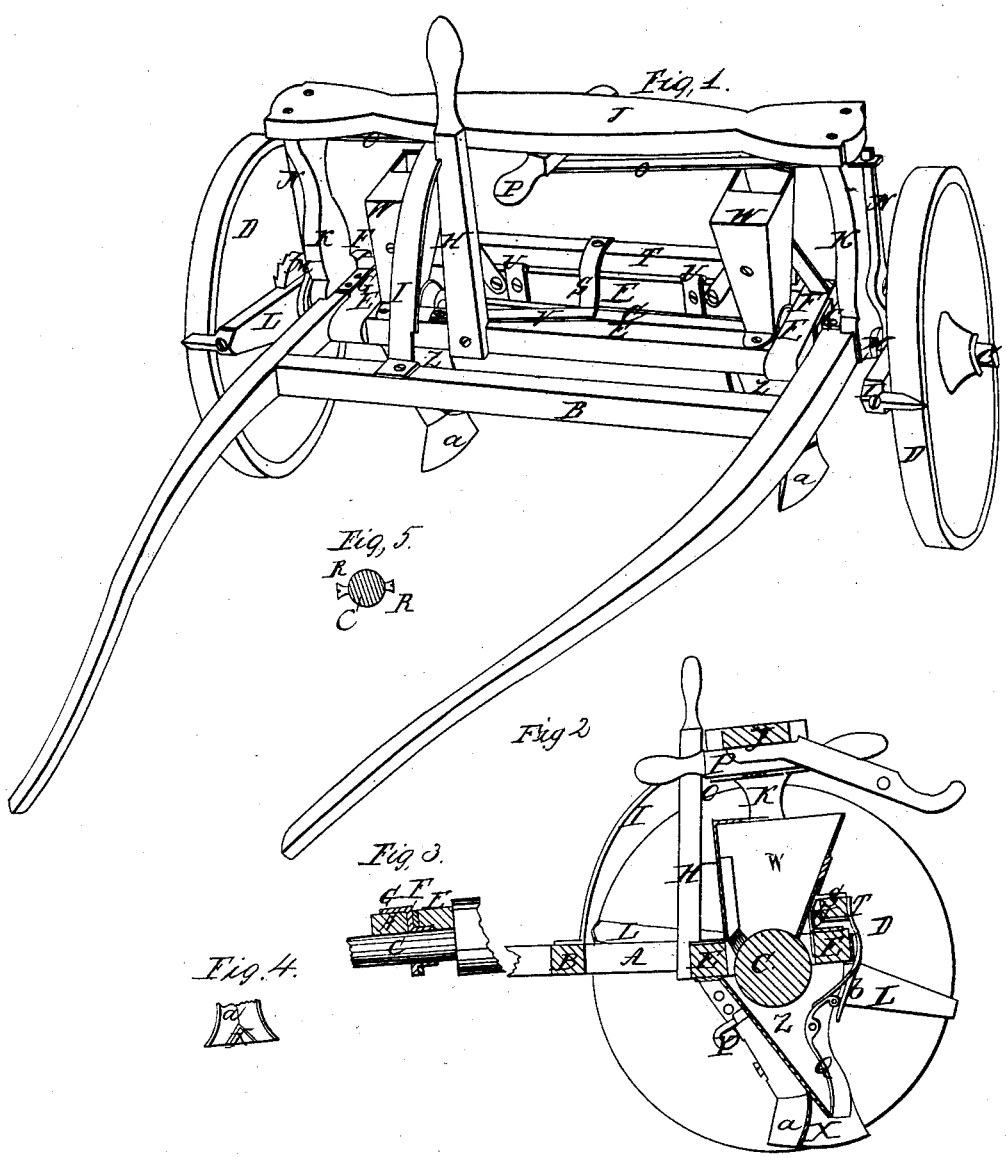

IVES W. McGAFFEY, OF BUFFALO, NEW YORK.

IMPROVEMENT IN CORN-PLANTERS.

Specification forming part of Letters Patent No. 17,566, dated June 16, 1857.

*To all whom it may concern:*

Be it known that I, IVES W. MCGAFFEY, of Buffalo, in the county of Erie and State of New York, have invented certain new and useful Improvements in Corn-Planters, which I have described in the following specification and illustrated in the accompanying drawings with sufficient clearness to enable others of competent skill to make and use my invention.

In the accompanying drawings, Figure 1 is a perspective view of my improved machine. Fig. 2 is a sectional elevation showing the arrangement and in part the method of operating the foot-valves which deliver the seed after it has passed the seeding-rollers and some of the other parts. Fig. 3 is a sectional detail view of a part of the axle and some other parts, showing the manner in which the swinging frame, by which the plows are raised, is supported without bearing directly upon the axle. (The axle is not here shown in section, but the parts surrounding it are.) Fig. 4 is a rear view of the lower portion of one of the plows. Fig. 5 is a detail section, showing the cams upon the shaft for operating the foot-valves.

A are the shafts or thills, and B is a cross-bar, which connects them together.

D are the traction-wheels loosely fitted upon the axle, so that they will turn without it.

C is the axle upon which the seeding-rollers are formed.

E is the swinging frame, to which the plows are attached. It is provided with iron boxes, F, which rest and may be turned upon a sleeved box, G, attached to a shaft or thill, A, so that the friction which any pressure in any direction upon the plows would cause does not come upon the axle, but upon the sleeved box. (See Fig. 3.) The frame E has a lever, H, attached to it, by which the plows are turned up, so as not to touch the ground, or brought down to their places for operating. The frame is held in position by the lever H catching into notches in the fender or hoop I, which is attached to the cross-bar B and the seat J. The seat J is supported by uprights, K attached to the thills.

L are the markers. They are attached to a sliding collar or clutch, M, by which axle may be clutched to a corresponding clutch upon the side of the wheel; or a pin set in the wheel so as to take into the clutch when it is thrown out into gear will answer the purpose. These clutches are operated by levers N, which are connected by the connecting-rods O to the clutch-lever P, under the seat of the driver. The levers N are hung to the uprights K, and the lever P to the seat.

Q are foot-valves, which deliver the seed to the ground, the seed being first dropped from the seeding-rollers upon the valves. These valves are operated by a couple of cams or screws, R, projecting from the axle. (See Fig. 5.) These screws or cams, as the axle revolves, come in contact with and raise the lever S, which is attached to a beam or bar of wood, T. This bar T is hung by springs U (which also serve as hinges) to the frame E.

From the back side of the bar T forked levers $b$ extend down and embrace the upper end of the valves Q, above the fulcrum on which they turn, and as the lever S is raised by the action of the cams the valves Q are opened and the seed allowed to fall, the cams which operate this lever being so arranged in reference to the markers that the seed will be dropped opposite the place at which the markers touch the ground. The lever S is kept down (when not raised by the cams) by a spring, V.

The seed-boxes W are attached to the frame E, and turn with it.

The plows $a$ have a deflector, X, in the form of an inverted V, which throws the grain out toward the sides of the furrow, so that it will be covered with more certainty.

The tugs or traces by which the machine is drawn are hitched to hooks Y, which are attached to a flange upon the spout G, which conveys the seed to the ground. The plows $a$ are attached to these spouts in such a manner as to be adjustable to the proper height without interfering with the foot-valves or their operation.

The operation of the machine is as follows: The operator, having filled the seed-boxes and attached his team, mounts his seat, and having thrown the clutches out of gear, so as to prevent the distribution of the seed, and the lever H into the lower notch, so as to raise the plows from the ground, he starts for the field. Arrived at the place of commencement, he grasps the lever P and throws the clutches into gear, and, having brought the lever H back to its upright position in the upper notch, (by which the plows are brought into their operating position,) he starts across the field. Arrived at the end of the rows, he throws the clutches out of gear and plows out the ground, and then brings his machine to the proper position for starting back on the next rows. He then takes hold of one of the markers and sets them so as to bring the hills in row transversely with those already deposited, or, as it is technically termed, "in check," and, having thrown the clutches and plows into operating position, starts back on his return rows.

While not claiming a swinging frame carrying the seed-boxes and plows, and by which the plows are raised or lowered, as described, what I do claim as new and useful herein, and desire to secure by Letters Patent, is—

Hanging said swinging frame E by boxes F upon fixed sleeve-boxes G, arranged round but distinct from the axle C, to insure freedom of the axle against resistance encountered by the plows without in the swinging of the frame E varying the relative concentric position of the axle and seed-distributing devices thereon to the seed-boxes.

I. W. McGAFFEY.

Witnesses:
W. I. COWEN,
S. P. BRECKINRIDGE.